Patented Apr. 30, 1946

2,399,340

UNITED STATES PATENT OFFICE 2,399,340

DISTILLATION OF AROMATIC OLEFINS

Raymond A. Franz, Wallingford, Pa., assignor to The United Gas Improvement Company, a corporation of Pennsylvania No Drawing. Application July 16, 1942,
Serial No. 451,222

20 Claims. (Cl. 202—57)

This invention relates to a process for stabilizing certain unsaturated hydrocarbons which show tendencies to oxidize and/or polymerize.

An object of my invention is to provide an improved method of purifying aromatic olefins and solutions and/or mixtures thereof, by fractional distillation without excessive polymerization in the still.

By aromatic olefins is meant any aromatic nucleus, substituted or otherwise, containing one or more unsaturated side chains. Examples of such aromatic olefins are styrene, vinyl naphthalene, substituted styrenes, as for example ring substituted styrenes such as the nuclearly alkylated styrenes of which ortho methyl styrene, meta methyl styrene, para methyl styrene, and the corresponding nuclearly ethylated styrenes; side chain substituted styrenes such as alpha-methyl styrene, beta methyl styrene, etc.; nuclearly and side chain substituted styrenes such as alpha-methyl-para-ethyl-styrene; divinyl substituted aromatic hydrocarbons, such as para-divinylbenzene, and divinylnaphthalene; etc.

Still another object of my invention is to provide an improved method for fractionally distilling aromatic olefins, solutions and/or mixtures thereof without the necessity of frequently stopping the distillation for the purpose of cleaning out the still and column.

Still other objects will be apparent from the following detailed description and claims.

The invention consists broadly in the stabilization of aromatic olefins and solutions and/or mixtures thereof during their distillation by the addition thereto of oxygen and a polymerization inhibitor containing one or more quinone, amine, and/or phenolic groups. Examples of such inhibitors containing one or more phenolic groups are para-n-butylaminophenol, catechol, and 2 - amino - 5 - hydroxytoluene. While the amounts of such inhibitors vary in practice from 0.001% to 5.0% by weight, I have found that an amount from 0.05% to 0.5% by weight to be very satisfactory.

The oxygen may be introduced to the distilling system as pure oxygen or air, or by mixing the oxygen and/or air with an inert gas such as carbon dioxide or nitrogen or by the addition of some compound designed to give up its oxygen under the conditions of the distillation. I have found that oxygen may be introduced by metering a given amount of air into the distilling pot at some satisfactory rate.

The amount of oxygen which is preferably used depends upon many variables such as the temperature of the distillation, the reflux ratio, the type of unsaturated hydrocarbon, the type of inhibitor and the quantity of inhibitor. If an excessive amount of oxygen is used, the quality of the unsaturated hydrocarbon might be impaired, while if an insufficient amount of oxygen is used the inhibitor might not be activated sufficiently to prevent some polymerization of the unsaturated hydrocarbon. To those skilled in the art a quantity can be readily determined which will produce optimum results. I have found in commercial practice that 1 to 10 cubic feet of air per pound of charge stock at a reflux ratio of about 5 to 10 gives very satisfactory results. The amount of inhibitor in this case varies from 0.05% to 5% by weight of the charge stock.

Although the oxygen may be injected into the distilling pot intermittently, I have found that a constant rate of introduction is preferred.

Example 1

A charge of 9910 lbs. of crude 61.6% methyl styrene was distilled in a partial vacuum at a pot temperature of 216° F. A period of 67 hours was necessary to complete the distillation at an average reflux ratio of 6.8 to 1. 0.3% by weight, based on the charge stock, of para-n-butyl-aminophenol was used as the inhibitor and placed in the distilling pot at the beginning of the distillation. No oxygen was bled into the system during this experiment. It was found from an analysis of the bottoms after the completion of the distillation that there was a loss of 9.6% of the original methyl styrene as polymer in the pot.

Example 2

A charge of methyl styrene similar to that used in Example 1 was distilled under the same conditions using the same inhibitor with one exception, namely, air was introduced to the pot at a constant rate during the distillation. The amount of air in this case was 0.073 cu. fet./lb. of charge stock. The quantity of methyl styrene lost as polymer was lowered to 8.4% of the original methyl styrene.

Example 3

A charge of methyl styrene similar to that used in Example 1 was distilled under the same conditions using the same inhibitor with one exception, namely, air was introduced to the pot at a constant rate during the distillation. The amount of air in this case was 0.594 cu. ft/lb. of charge stock. The quantity of methyl styrene lost as polymer was reduced to 4.5% of the original methyl styrene.

Example 4

A charge of methyl styrene similar to that used in Example 1 was distilled under the same conditions with two exceptions. First, the inhibitor used was 0.2% by weight of catechol based on the charge stock. Secondly, air was introduced to the pot during the distillation at a constant rate. The amount of air in this case was 0.569 cu. ft./lb of charge stock The quantity of methyl styrene lost as polymer was reduced to 5.2% of the original methyl styrene.

Example 5

A sample of 98% styrene was heated in the presence of air at a temperature of 100° C. for a period of two hours at which time 7% by weight of the styrene present was found to have been polymerized.

Example 6

This was a repetition of Example 5 with the exception that 0.05% by weight of catechol was added to the styrene prior to heating. Less than 0.1% of the styrene present in the original sample was found to have been polymerized.

Example 7

This was a repetition of Example 6 with the exception that nitrogen was substituted for air. A total of 7% by weight of the styrene present in the original sample was found to be polymerized.

Polymerization inhibitors such as beta-phenyl-napthylamine, 2-amino-5-hydroxytoluene, hydroquinone, alphanaphthol, quinone, n-butyl-para-aminophenol, and particularly catechol, para tertiary butyl catechol, and pyrogallol are particularly adapted to the practice of my invention.

While various procedures have been particularly described, these are of course subject to considerable variation. Therefore, it will be understood that the foregoing specific examples are given by way of illustration and that changes, omissions, additions, substitutions, and/or modifications might be made within the scope of the claims without departing from the spirit of the invention which is intended to be limited only as required by the prior art.

I claim:

1. In the distillation of a heat polymerizable aromatic olefin, the improvement which comprises distilling said aromatic olefin in the presence of oxygen and in the presence of a polymerization inhibitor selected from the group of polymerization inhibitors consisting of polymerization inhibitors containing a phenol group, polymerization inhibitors containing a quinone group, and polymerization inhibitors containing an amine group.

2. In the distillation of a heat polymerizable aromatic olefin, the improvement which comprises distilling said aromatic olefin in the presence of oxygen and in the presence of a polymerization inhibitor containing a phenol group.

3. In the distillation of a heat polymerizable aromatic olefin, the improvement which comprises distilling said aromatic olefin in the presence of oxygen and in the presence of a polymerization inhibitor containing a quinone group.

4. In the distillation of a heat polymerizable aromatic olefin, the improvement which comprises distilling said aromatic olefin in the presence of oxygen and in the presence of a polymerization inhibitor containing an amine group.

5. In the distillation of a heat polymerizable aromatic olefin, the improvement which comprises distilling said aromatic olefin in the presence of oxygen and in the presence of catechol.

6. In the distillation of a heat polymerizable aromatic olefin, the improvement which comprises distilling said aromatic olefin in the presence of oxygen and in the presence of pyrogallol.

7. In the distillation of a heat polymerizable aromatic olefin, the improvement which comprises distilling said aromatic olefin in the presence of oxygen and in the presence of quinone.

8. A method for refining styrene comprising fractionally distilling said styrene in the presence of oxygen and in the presence of at least one polymerization inhibitor selected from the group of polymerization inhibitors consisting of polymerization inhibitors containing a phenol group, polymerization inhibitors containing a quinone group, and polymerization inhibitors containing an amine group.

9. A method for refining styrene comprising fractionally distilling said styrene in the presence of air and in the presence of catechol.

10. A method for refining an alkylated styrene comprising fractionally distilling said alkylated styrene in the presence of oxygen and in the presence of a polymerization inhibitor selected from the group of polymerization inhibitors consisting of polymerization inhibitors containing a phenol group, polymerization inhibitors containing a quinone group, and polymerization inhibitors containing an amine group.

11. A process for refining methyl styrene comprising fractionally distilling said methyl styrene in the presence of air and in the presence of catechol.

12. A process for refining ring-substituted monomethyl styrene comprising fractionally distilling said ring-substituted monomethyl styrene in the presence of air and in the presence of catechol.

13. A method for increasing the concentration of styrene in a light oil styrene fraction comprising fractionally distilling said light oil styrene fraction in the presence of air and in the presence of a polymerization inhibitor selected from the group of polymerization inhibitors consisting of polymerization inhibitors containing a phenol group, polymerization inhibitors containing a quinone group, and polymerization inhibitors containing an amine group.

14. A method for increasing the concentration of methyl styrene in a light oil methyl styrene fraction comprising fractionally distilling said light oil methyl styrene fraction in the presence of air and in the presence of a polymerization inhibitor selected from the group of polymerization inhibitors consisting of polymerization inhibitors containing a phenol group, polymerization inhibitors containing a quinone group, and polymerization inhibitors containing an amine group.

15. A method for refining a light oil styrene fraction comprising distilling said styrene fraction in a fractionating column in the presence of a polymerization inhibitor selected from the group of polymerization inhibitors consisting of polymerization inhibitors containing a phenol group, polymerization inhibitors containing a quinone group, and polymerization inhibitors containing an amine group while passing a stream of air through said column in an amount equivalent to not more than 10 cubic feet of air per pound of charge stock.

16. A method for refining a light oil methyl styrene fraction comprising distilling said methyl styrene fraction in a fractionating column in the presence of a polymerization inhibitor selected from the group of polymerization inhibitors consisting of polymerization inhibitors containing a phenol group, polymerization inhibitors containing a quinone group, and polymerization inhibitors containing an amine group while passing a stream of air through said column in an amount equivalent to not more than 10 cubic feet of air per pound of charge stock.

17. A method for refining a light oil styrene fraction which comprises distilling said fraction in the presence of air and in the presence of pyrogallol.

18. A method for refining a light oil styrene fraction which comprises distilling said fraction in the presence of air and in the presence of quinone.

19. A method for refining a light oil methyl styrene fraction which comprises distilling said fraction in the presence of air and in the presence of pyrogallol.

20. A method for refining a light oil methyl styrene fraction which comprises distilling said fraction in the presence of air and in the presence of quinone.

RAYMOND A. FRANZ.